United States Patent
Yousef et al.

(10) Patent No.: US 9,113,640 B2
(45) Date of Patent: Aug. 25, 2015

(54) COATED SHELL EGGS AND METHOD OF MAKING SAME

(71) Applicant: Ohio State Innovation Foundation, Columbus, OH (US)

(72) Inventors: Ahmed E. Yousef, Dublin, OH (US); Tarik A. Yousef, Columbus, OH (US); David Kasler, Ashville, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 14/025,295

(22) Filed: Sep. 12, 2013

(65) Prior Publication Data

US 2015/0072050 A1 Mar. 12, 2015

(51) Int. Cl.
*A23B 5/06* (2006.01)

(52) U.S. Cl.
CPC ........................................ *A23B 5/06* (2013.01)

(58) Field of Classification Search
CPC ........... A23L 1/32; A23B 5/0052; A23B 5/06
USPC .......................... 426/298, 614, 300, 301, 310
See application file for complete search history.

(56) References Cited

U.S. PATENT DOCUMENTS

| | | | |
|---|---|---|---|
| 1,370,628 A * | 3/1921 | Clairemont | 426/301 |
| 1,388,024 A * | 8/1921 | Clairemont et al. | 426/301 |
| 1,636,420 A * | 7/1927 | Kasser | 426/300 |
| 1,935,901 A * | 11/1933 | Augenblick | 8/523 |
| 2,439,808 A | 4/1948 | Hodson | |
| 2,482,274 A | 9/1949 | Hewitt et al. | |
| 2,568,917 A * | 9/1951 | Gray | 264/36.2 |
| 2,660,530 A * | 11/1953 | Adams | 426/299 |
| 2,876,110 A * | 3/1959 | Stadelman et al. | 426/301 |
| 5,431,939 A | 7/1995 | Cox et al. | |
| 5,589,211 A | 12/1996 | Cox et al. | |
| 5,722,342 A | 3/1998 | Line et al. | |
| 6,035,647 A | 3/2000 | Polster | |
| 6,103,284 A | 8/2000 | Polster | |
| 6,113,961 A | 9/2000 | Polster | |
| 6,162,475 A | 12/2000 | Hagenmaier et al. | |
| 6,322,833 B1 | 11/2001 | Davidson | |
| 6,455,094 B1 | 9/2002 | Ball et al. | |
| 6,692,784 B2 | 2/2004 | Davidson | |
| 6,974,599 B2 | 12/2005 | Vandepopuliere et al. | |
| 7,052,726 B2 | 5/2006 | Park et al. | |
| 8,071,146 B2 | 12/2011 | Erasmus et al. | |

(Continued)

FOREIGN PATENT DOCUMENTS

CN  101779701 B  8/2011
EP  0948596  10/1999

(Continued)

OTHER PUBLICATIONS

The Free Dictionary. 2010. http://encyclopedia2.thefreedictionary.com/Soft+Resin.*

(Continued)

*Primary Examiner* — Anthony Weier
(74) *Attorney, Agent, or Firm* — Ballard Spahr LLP

(57) ABSTRACT

Coatings for shell eggs improve the strength and shatter resistance of processed eggs. The coatings include food grade natural resins such as shellac, mixtures of paraffin and beeswax, and food grade polymer emulsions such as polyvinyl acetate.

24 Claims, 4 Drawing Sheets

(56) References Cited

U.S. PATENT DOCUMENTS

| | | |
|---|---|---|
| 8,327,798 B2 | 12/2012 | Lahav et al. |
| 2002/0041921 A1 | 4/2002 | Davidson et al. |
| 2004/0009271 A1 | 1/2004 | Davidson et al. |
| 2004/0081781 A1* | 4/2004 | Corby et al. ............... 428/35.7 |
| 2008/0096979 A1 | 4/2008 | Pilgaonkar et al. |
| 2010/0186674 A1 | 7/2010 | Cahill, Jr. et al. |

FOREIGN PATENT DOCUMENTS

| | | |
|---|---|---|
| EP | 1399026 | 3/2004 |
| JP | 61239864 | * 10/1986 |
| WO | 2013006470 A1 | 1/2013 |
| WO | 2013039826 A1 | 3/2013 |

OTHER PUBLICATIONS

Fibel. 2006. http://www.betriebsmittelliste.ch/fileadmin/documents/de/hifu/stellungnahmen/potassium_bicarbonate_organic.pdf.*

Author Unknown; Maintaining Egg Shell Quality (online); obtained from www.thepoultrysite.com/articles/979/maintaining-egg-shell-quality; Nov. 7, 2013; 5 pages.

Author Unknown; Factors Influencing Shell Quality (online); obtained from www.thepoultrysite.com/articles/1003/factors-invluencing-shell-quality; Nov. 7, 2013; 3 pages.

Author Unknown; How to Improve Shell Quality (online); obtained from www.thepoultrysite.com/articles/1004/how-to-improve-shell-quality; Nov. 7, 2013; 3 pages.

Author Unknown; Innovations in Eggshell Quality Evaluation (online); obtained from www.thepoultrisite.com/poultrynews/28508/innovations-in-eggshell-quality-evaluation; Nov. 7, 2013; 6 pages.

Biladeau et al.; The Effects of Edible Coatings on Chicken Egg Quality Under Refrigerated Storage; Poultry Science 88:1266-1274, 2009.

Copenheaver, Blaine R.; International Search Report from corresponding PCT application No. PCT/US2014/053145; Jan. 29, 2015; pp. 1-5; United States Patent and Trademark Office as Searching Authority; Alexandria, Virginia, USA.

Copenheaver, Blame R.; Written Opinion from corresponding PCT application No. PCT/US2014/053145; Jan. 29, 2015; pp. 1-7; United Slates Patent and Trademark Office as Searching Authority; Alexandria, Viginia, USA.

* cited by examiner

Graph 1. Example of shell egg strength analysis, measured by a material testing instrument (Instron 5542). The figure represents changes in compression load (Newtons) during crushing of coated and uncoated shell-egg. Eggs with known weak shells (processed) were tested.

Table 1. Effect of different coating materials on strength of the shell of whole eggs.

| Coating[a] | Work (N * mm)[b] |
|---|---|
| Fresh, uncoated | 34.07 |
| Processed[c], uncoated | 18.41 |
| Dewaxed shellac (2 coats) | 22.96 |
| Decolorized Shellac (2 coats) | 23.56 |
| Dewaxed shellac (5 coats) | 35.46 |
| Bleached Shellac (7 coats) | 30.27 |
| Paraffin sprayed | 22.08 |
| Paraffin, dipped | 25.76 |
| Beeswax, dipped | 44.93 |

[a] All coated eggs were previously processed.
[b] Work (Newtons x distance in millimeters) required to crush whole egg shell, as measured using the Instron.
[c] Processed eggs were pasteurized using conditions known to weaken the shell.

Fig. 5

Graph 2. Strength of shell of whole eggs that were processed and coated with various coating materials. Bars represent averages of at least 4 eggs; fresh eggs bar is an average of 43 eggs tested.

COATED SHELL EGGS AND METHOD OF MAKING SAME

FIELD OF THE INVENTION

This invention relates to coating compositions for increasing the strength of shell eggs, and to shell eggs coated with such compositions.

BACKGROUND

The shell of a whole egg provides an effective package that protects the egg contents against contaminants from the environment and other sources. Integrity of the shell is critical for egg quality and safety. Shell cracks or imperfections permit ingress of bacteria that often grow rapidly when they migrate to the egg yolk. Growth of bacteria in egg contents leads to spoilage and increased risk of disease transmission. Egg shells are, however, inherently brittle; consequently, eggs are subject to unintentional cracking during laying, processing (including washing, rapid cooling, sanitization, and pasteurization), packing, shipping, stocking and handling by the end user. Mechanical handling during these operations further increases the potential for egg cracking. Pasteurization processes that rely on heat or heat combined with chemical treatments (e.g., heat-ozone combination) can weaken the egg shell and increase its tendency to shatter.

Upon detection (usually before packing and shipping), cracked eggs (known as "checks") are diverted away from the retail market. However, eggs with weak shells are not detected by crack-checking devices, and may find their way onto supermarket shelves. These eggs tend to crack during routine shipping, stocking, or handling by the end purchaser. Furthermore, eggs having weak shells tend to shatter during use, often disrupting the yolk and mixing it with the albumen, or leaving shell fragments in egg contents. Shell weakness is disadvantageous, as it requires that the egg is cracked in a controlled manner so that the egg contents are preserved intact, if desired, during use. Therefore, methods and formulations which improve the strength of egg shells without adverse effect on their positive characteristics would be beneficial to the egg industry as well as consumers.

SUMMARY

The invention concerns a shell egg having improved strength. In one example embodiment, the shell egg comprises a shell having an outer surface. A coating covers at least a portion of the outer surface. The coating comprises a food grade natural resin. In a particular example, the food grade natural resin comprises shellac. The shellac may comprise dewaxed raw shellac, decolorized shellac and/or bleached shellac. The coating has a thickness sufficient to increase the energy required to crush the shell egg as compared with a similar shell egg having no coating. Additionally, the coating has a thickness sufficient to prevent the shell egg from shattering when cracked open. Both the coating thickness and its inherent strength contribute to the improvement in shell strength.

In an example embodiment, the coating extends in a band around the shell egg. In another example embodiment, the coating extends over the outer surface in its entirety. In a particular example embodiment, the coating has a uniform thickness. For example, the coating may have a thickness from about 0.04 mm to about 0.45 mm.

By way of further example, the shell egg may comprise a shell having an outer surface and a coating covering at least a portion of the outer surface wherein the coating comprises a wax, such as paraffin wax or beeswax, and particularly a combination of paraffin wax and beeswax. In an example embodiment, the coating may comprise a ratio of the paraffin wax to the beeswax from about 2:8 to about 8:2 by weight. In a particular example embodiment, the coating comprises a ratio of the paraffin wax to the beeswax in a ratio of about 1 to 1 by weight.

When coated with paraffin wax, beeswax, or paraffin wax-beeswax mixtures, the coating of the shell egg has a thickness sufficient to increase the energy required to crush the shell egg as compared with a comparable shell egg having no coating, as well as to prevent the shell egg from shattering when cracked open.

In an example embodiment, the coating may extend in a band around the shell egg, or the coating may extend over the outer surface in its entirety. In a particular example embodiment, the coating has a uniform thickness. The coating may, for example, have a thickness from about 0.05 mm to about 0.50 mm.

In another example embodiment, the shell egg comprises a shell having an outer surface and a coating covering at least a portion of the outer surface. In this example the coating comprising paraffin wax. In his example the coating has a thickness sufficient to increase the energy required to crush the shell egg as compared with a comparable shell egg having no coating. In another example embodiment, the shell egg comprises a shell having an outer surface and a coating covering at least a portion of the outer surface. The coating comprises beeswax in this example. The coating has a thickness sufficient to increase the energy required to crush the shell egg as compared with a comparable shell egg having no coating.

In another example embodiment, the shell egg comprises a shell having an outer surface and a coating covering at least a portion of the outer surface. The coating comprises a food grade polymer emulsion in this example. In a particular example embodiment, the food grade polymer emulsion comprises polyvinyl acetate. The coating has a thickness sufficient to increase the energy required to crush the shell egg as compared with a comparable shell egg having no coating. The coating may extend in a band around the shell egg. By way of further example, the coating may extend over the outer surface in its entirety. The coating may have a uniform thickness. By way of example, the coating may have a thickness from about 0.02 mm to about 0.40 mm. In a particular example embodiment, the coating has a thickness sufficient to increase the energy required to crush the shell egg as compared with a comparable shell egg having no coating. The coating also has a thickness sufficient to prevent the shell egg from shattering when cracked open.

For all of the above-described example embodiments, the coating may further comprise a food-grade colorant (including FD&C Blue No. 1, FD&C Red No. 3, Cochineal extract, Carmine, or other natural or synthetic colorants) a food-grade fungicide (including benzoic acid, sorbic acid, other organic acids, parabens, or natamycin), a food-grade anti-bacterial agent (including nitrites, nisin or other antimicrobial peptides, or antimicrobial plant extracts) as well as combinations thereof. The coating may contain solvents (including ethanol and/or acetone) which also makes the coating itself an antimicrobial agent.

The invention further encompasses a method of increasing the strength of a shell egg. The shell egg has a shell with an outer surface. In an example embodiment, the method comprises applying a food grade natural resin coating to at least a portion of the outer surface. The food grade natural resin comprises shellac in a particular example. The example method may further comprise spraying the shellac onto at least a portion of the outer surface. The shellac is in a liquid solution. The shellac is dissolved in organic solvents including ethanol, acetone or their combinations. The method further comprises drying the shellac. In one example, the liquid solution comprises shellac and ethanol. The ethanol may be about 190 proof and the shellac may comprise about 5% to about 30% of the solution by weight. In a particular example, the ethanol is about 190 proof and the shellac comprises about 20% of the solution by weight. In another example, the liquid solution comprises shellac and acetone. The shellac may comprise about 5% to about 30% of the solution by weight. In a third example, the liquid solution comprises shellac dissolved in a mixture of ethanol and acetone. The shellac may comprise about 5% to about 30% of the solution by weight. The ratio of ethanol to acetone in the solvent mixture ranges from about 90:10 to 10:90 by weight. In a particular embodiment, the ratio of ethanol to acetone in the liquid solution is about 3:1 by weight.

By way of example, drying is effected by subjecting the coating to a stream of gas at ambient temperature or heated to a temperature above ambient. The stream of heated gas may, for example, comprise air at temperature between about 20° C. and about 50° C.

The invention further includes a method of increasing the strength of a shell egg, the shell egg having a shell with an outer surface, where in the example method comprises applying a food grade polymeric emulsion coating to at least a portion of the outer surface. The food grade polymeric emulsion may comprise polyvinyl acetate in a particular example. This example method may further comprise spraying the polyvinyl acetate onto at least a portion of the outer surface and drying the polyvinyl acetate.

Another example embodiment of a method of increasing the strength of a shell egg, the shell egg having a shell with an outer surface, comprises applying a coating comprising paraffin wax and beeswax onto at least a portion of the outer surface. This method may further comprise spraying the coating onto at least a portion of the outer surface and drying the coating. The example method may further comprise polishing the coating.

BRIEF DESCRIPTION OF THE DRAWINGS

FIG. 5 is a table showing the effect of different coating materials on strength of the shell of whole eggs.

DETAILED DESCRIPTION

Figure 1:
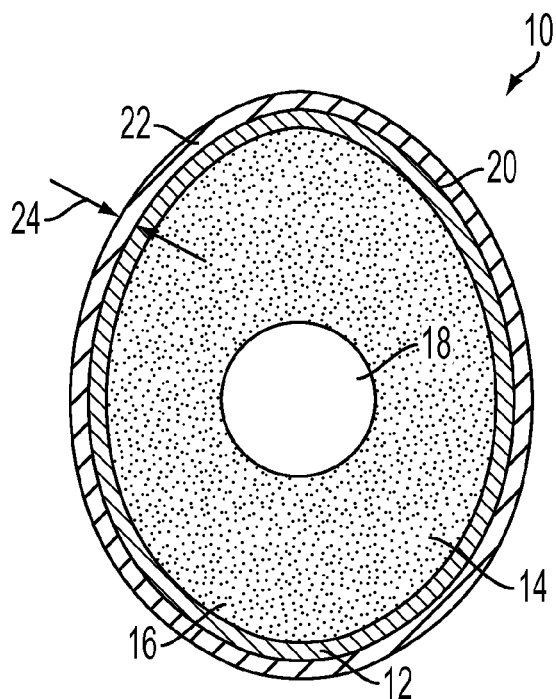
FIG. 1 is a cross sectional view of an example shell egg having a coating according to the invention.
Figure 2:
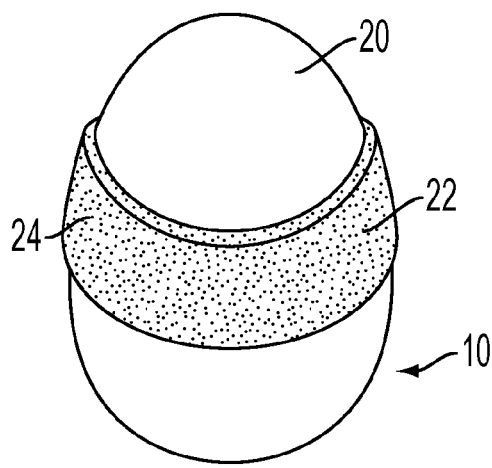
FIGS. 2 and 3 are isometric views of example shell eggs having a coating according to the invention.
Figure 3:
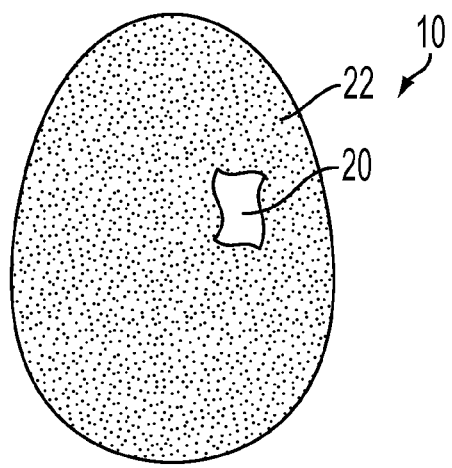

FIG. 1 shows a shell egg 10 comprising a shell 12 surrounding an interior space 14, the interior space containing an albumen layer 16 surrounding a yolk 18. Shell 12 has an outer surface 20. A coating 22 covers at least a portion of the shell outer surface 20. For example, as shown in FIG. 2, the coating 22 may comprise a band 24 extending around the shell egg 10. FIG. 3 shows another embodiment, wherein the coating 22 covers the entire outer surface 20 of the egg 10. With reference again to FIG. 1, coating 22 may have a thickness 24 which is uniform over the entire coating, or the thickness 24 of coating 22 may vary as a function of position about the outer surface 20. The minimum thickness of the coating 22 is such that it strengthens the shell 12, i.e., coating 22 has a thickness 24 sufficient to increase the energy required to crush the shell egg 10 when compared with a comparable shell egg having no coating. The thickness 24 of the coating 22 should also be sufficient to prevent the shell egg 10 from shattering when cracked open.

In one example embodiment, the coating 22 comprises a food grade natural resin, for example, shellac. The shellac may be dewaxed raw shellac, decolorized shellac, bleached shellac, and/or combinations thereof. When shellac is used as the coating 22, the thickness 24 may range from about 0.04 mm to about 0.45 mm. The shellac may be brushed or sprayed in liquid form onto the outer surface 20 of shell 12 to form the coating 22. In one example, the liquid shellac comprises a shellac and ethanol solution. Experiments have shown that ethanol of 190 proof is an effective vehicle for the shellac. The shellac may comprise from about 5% to about 30% of the solution by weight. Experiments have also shown that a solution comprising 190 proof ethanol and about 20% shellac by weight is advantageous. After the liquid shellac-ethanol solution is applied to the shell eggs 10 the solution is dried to form the coating 22. Drying may be effected by subjecting the shell eggs to a stream of heated gas, such as air heated to between about 20° C. and about 50° C. Multiple spraying and drying steps may be used to achieve a coating 22 having the desired thickness 24.

In another example, the liquid shellac comprises a shellac and acetone solution. The shellac may comprise from about 5% to about 30% of the solution by weight. After the liquid shellac-acetone solution is applied to the shell eggs 10 the solution is dried to form the coating 22. Drying may be effected by subjecting the shell eggs to a stream of heated gas, such as air heated to between about 20° C. and about 50° C. Multiple spraying and drying steps may be used to achieve a coating 22 having the desired thickness 24.

In a further example, the liquid shellac comprises shellac, ethanol and acetone in solution. The shellac may comprise from about 5% to about 30% of the solution by weight. It is expected that the ratio of ethanol to acetone may range from about 90:10 to 10:90 by weight for practical applications. It has been found that a ratio of ethanol to acetone of about 3:1 by weight is advantageous and promotes rapid drying. After the liquid shellac-ethanol-acetone solution is applied to the shell eggs 10 the solution is dried to form the coating 22. Drying may be effected by subjecting the shell eggs to a stream of heated gas, such as air heated to between about 20° C. and about 50° C. Multiple spraying and drying steps may be used to achieve a coating 22 having the desired thickness 24.

In another example embodiment, the coating 22 comprises a mixture of paraffin wax and beeswax. When the mixture of paraffin wax and beeswax is used as the coating 22, the thickness 24 may range from about 0.05 mm to about 0.5 mm. The ratio of paraffin wax to beeswax in the mixture may range from about 2:8 to about 8:2 by weight, with a ratio of paraffin wax to bees wax of about 1:1 being found advantageous in experiments. The mixture of paraffin wax and beeswax is applied to the outer surface 20 of the shell egg 10 in liquid form and may be effected by dipping the shell eggs into a molten wax bath, or by spraying or brushing the molten wax mixture onto the outer surface.

In a particular dip coating method, the paraffin and beeswax were heated in a double-walled boiler at 80° C. to 90° C. until fully liquefied. Eggs at 4° C. to 25° C. were dipped in the molten wax using a wire holder and quickly removed once fully submerged. Within seconds of removal from the wax, eggs were polished using a blotting paper (although it is expected that filter paper should be equally useful). The paper removes and spreads any excess wax that was not fully solidified.

In a particular spray coating method, a gravity-fed sprayer was used to spray-coat the eggs. The sprayer used a Venturi-type nozzle to pull the molten wax mixture from a reservoir and then used other air passages to force the spray pattern in a certain direction ranging from almost linear to circular application. In this example, air at ambient temperature was passed through the sprayer. To prevent cooling the wax and clogging the spry nozzles, the sprayer was heated up to 90° C. until it was at a temperature equal to that of the molten wax mixture. Similarly, hot air could be used to maintain wax spray in the molten state. As the hot wax contacted the eggs, it solidified. As only one side of the eggs could be coated at a time, the eggs were rotated to ensure complete coverage of the outer surface 20. This application method may be repeated until the desired number of coats, providing a desired coating thickness, is achieved.

The dip and spray coating methods described above may also be used to apply a coating of only paraffin wax or only beeswax to achieve a coating having a thickness sufficient to increase the energy required to crush the shell egg as compared with a comparable shell egg having no coating.

In another example embodiment, the coating 22 comprises a food grade polymeric emulsion, for example, polyvinyl acetate. When polyvinyl acetate is used as the coating 22, the thickness 24 may range from about 0.02 mm to about 0.4 mm. The polyvinyl acetate may be brushed or sprayed in liquid form onto the outer surface 20 of shell 12 to form the coating 22. Drying may be effected by subjecting the shell eggs to a stream of heated gas, such as air heated to between about 20° C. and about 50° C. Multiple spraying and drying steps may be used to achieve a coating 22 having the desired thickness 24.

The coatings listed above, i.e., the food grade natural resin (shellac), the wax mixture (paraffin and beeswax), single wax coatings, and food grade polymeric resins (polyvinyl acetate) may also be mixed with other agents such as food-grade colorant (including FD&C Blue No. 1, FD&C Red No. 3, Cochineal extract, Carmine, or other natural or synthetic colorants) a food-grade fungicide (including benzoic acid, sorbic acid, other organic acids, parabens, or natamycin), a food-grade anti-bacterial agent (including nitrites, nisin or other antimicrobial peptides, or antimicrobial plant extracts) as well as combinations thereof.

Result Summary of Testing of Egg Shell Strength as Affected by Processing and Coating Eggs tested in these experiments were obtained from Hemmelgarn & Sons, Inc., Coldwater, Ohio. Each trail involved treating eggs collect on the same day from the same farm. Before coating, shell eggs were processed using a procedure known to weaken the shell. This procedure involves heating shell eggs in a water bath at 58° C. and treating heated eggs with a high concentration of gaseous ozone (more than 10%, wt/wt, of ozone in oxygen). In one of the experiments, processed eggs were coated with three coating materials; these are shellac, paraffin wax and beeswax. Different varieties of shellac were tested as coating materials. Fresh uncoated eggs were included in the experiment to represent eggs with normal shell strength. Additionally, processed uncoated eggs also were included in the study.

Figure 4:
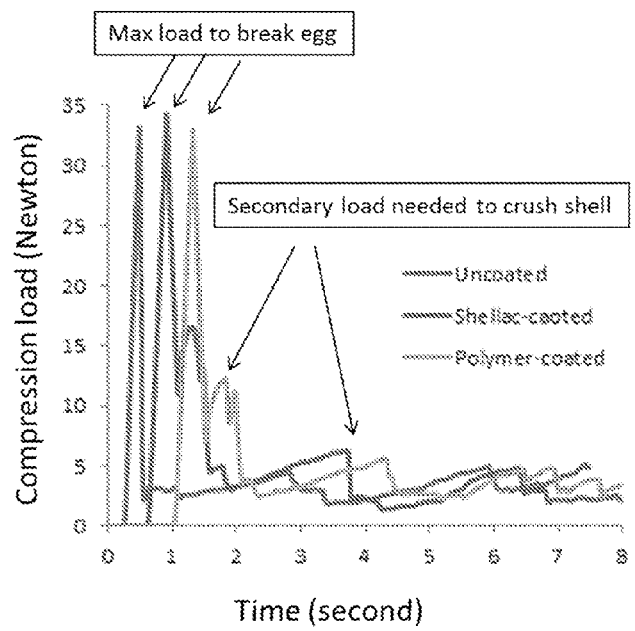
FIG. 4 is a graph showing an example of shell egg strength analysis.

Eggs were tested for strength of the shell and its tendency to shatter using a material testing instrument (Instron 5542; Instron, Norwood, Mass., USA) equipped with an appropriate compression anvil (S5402A). Data from the tests indicates that two distinctive regions of strength are evident. The first region is simply a force required to initially crack the egg. Application of a coating was shown to increase the initial cracking force above that of processed eggs. The second region described the force needed to crush the eggs when the anvil proceeds for a distance of 4 mm (Graph 1 in FIG. 4).

Figure 6:
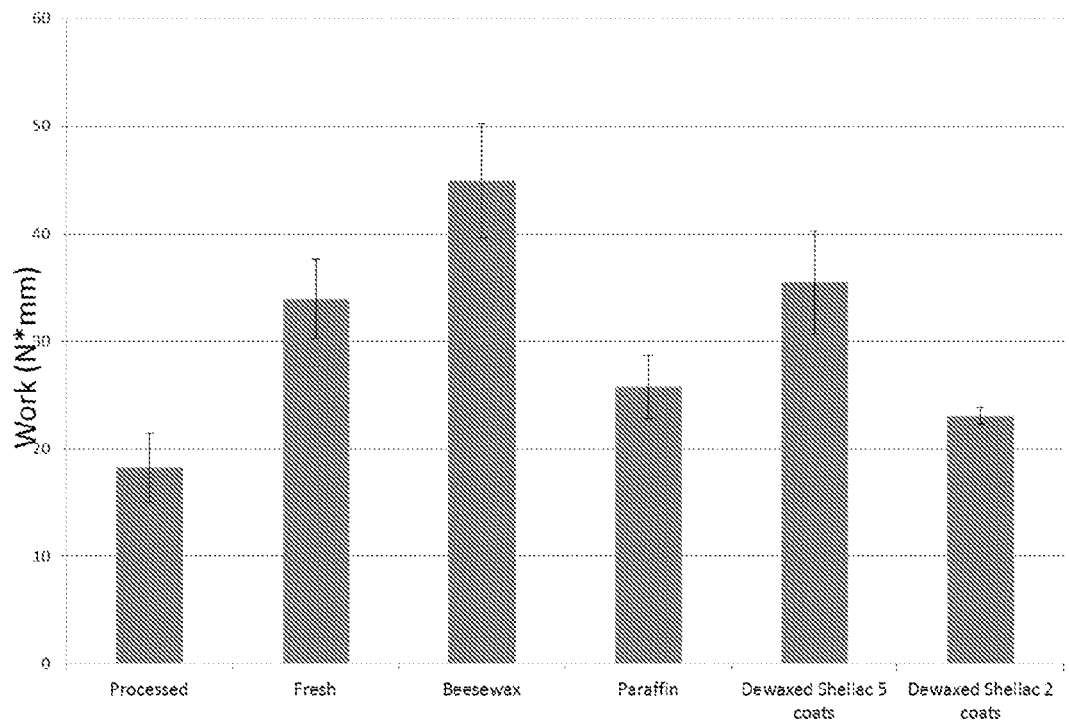
FIG. 6 is a graph showing the strength of shell of whole eggs that were processed and coated with various coating materials.

When the work (energy) required to crush the eggs was calculated from the data, the trends indicated that the fresh egg required more work (30 to 40 N*mm) to crush its shell, compared to the work required to crushed an egg processed in a way to weaken its shells (15 to 20 N*mm). The data also indicated that the processed eggs coated by dipping in beeswax had the strongest shell (45 N*mm). Processed eggs coated with shellac have stronger shell (23-30 N*mm), compared to that of processed and uncoated eggs. Although coatings materials varied in ability to protect egg shell, beeswax and shellac showed significant improvement in shell strength. Examples of these data are presented in Table 1 of FIG. 5 and Graph 2 of FIG. 6.

The following advantages are expected from coated eggs according to the invention as disclosed herein:

Coated eggs are expected to have longer shelf life in consumer's refrigerators.

The coating allows for application of antifungal agents that prevent mold growth during storage.

The coating is expected to improve the safety of shell eggs by preventing cross contamination and ingress of pathogenic organisms through cracks in the shell.

The coatings are expected to decrease egg loss and improve consumers experience during egg preparation.

It is expected that coated eggs will be easier to label with company logos.

Coating material could be colored to distinguish brands and to appeal to consumers.

What is claimed is:

1. A shell egg, comprising:
a shell having an outer surface;
a coating covering a portion of said outer surface, said coating comprising a food grade natural resin, wherein said coating extends in a band around said shell egg.

2. The shell egg according to claim 1, wherein said food grade natural resin comprises shellac.

3. The shell egg according to claim 2, wherein said shellac comprises dewaxed raw shellac.

4. The shell egg according to claim 2, wherein said shellac comprises decolorized shellac.

5. The shell egg according to claim 2, wherein said shellac comprises bleached shellac.

6. The shell egg according to claim 1, wherein said coating has a thickness sufficient to increase the energy required to crush said shell egg as compared with a comparable shell egg having no coating.

7. The shell egg according to claim 1, wherein said coating has a uniform thickness.

8. The shell egg according to claim 7, wherein said coating has a thickness from about 0.04 mm to about 0.45 mm.

9. The shell egg according to claim 1, wherein said coating has a thickness sufficient to prevent said shell egg from shattering when cracked open.

10. The shell egg according to claim 1, wherein said coating further comprises an agent selected from the group consisting of a colorant, a fungicide, an anti-bacterial agent, and combinations thereof.

11. A method of increasing the strength of a shell egg, said shell egg having a shell with an outer surface, said method comprising:
applying a food grade natural resin coating to a portion of said outer surface, wherein said coating extends in a band around said shell egg.

12. The method according to claim 11, wherein said food grade natural resin comprises shellac.

13. The method according to claim 11, further comprising:
spraying said shellac onto said at least said portion of said outer surface, said shellac being in a liquid solution; and
drying said shellac.

14. The method according to claim 13, wherein said liquid solution comprises shellac and ethanol.

15. The method according to claim 14, wherein said ethanol is about 190 proof and said shellac comprises about 5% to about 30% of said solution by weight.

16. The method according to claim 14, wherein said ethanol is about 190 proof and said shellac comprises about 20% of said solution by weight.

17. The method according to claim 13, wherein said liquid solution comprises shellac and acetone.

18. The method according to claim 17, wherein said shellac comprises about 5% to about 30% of said liquid solution by weight.

19. The method according to claim 13, wherein said liquid solution comprises shellac, ethanol and acetone.

20. The method according to claim 19, wherein said shellac comprises about 5% to about 30% of said liquid solution by weight.

21. The method according to claim 19, wherein the ratio of ethanol to acetone in said liquid solution ranges from about 90:10 to about 10:90 by weight.

22. The method according to claim 19, the ratio of ethanol to acetone in said liquid solution is about 3:1 by weight.

23. The method according to claim 13 wherein said drying is effected by subjecting said coating to a stream of heated gas.

24. The method according to claim 23, wherein said stream of heated gas comprises air heated to between about 20° C. and about 50° C.

* * * * *